United States Patent [19]
Gee et al.

[11] Patent Number: 4,976,390
[45] Date of Patent: Dec. 11, 1990

[54] POCKET FIBER OPTIC CLEAVER

[75] Inventors: Arnold E. Gee; Jeffrey B. Shank, both of Williamsport, Pa.

[73] Assignee: GTE Products Corporation, Stamford, Conn.

[21] Appl. No.: 247,002

[22] Filed: Sep. 20, 1988

[51] Int. Cl.⁵ ............................................ C03B 37/16
[52] U.S. Cl. ...................................... 225/96; 225/106
[58] Field of Search ................ 225/96, 96.5, 101, 105, 225/106

[56] References Cited
U.S. PATENT DOCUMENTS

| | | | |
|---|---|---|---|
| 4,262,417 | 4/1981 | Logan et al. | 30/140 |
| 4,315,368 | 2/1982 | Basile | 30/124 |
| 4,618,084 | 10/1986 | Andrews et al. | 225/96 |
| 4,644,647 | 2/1987 | Szostak et al. | 30/164.9 |

FOREIGN PATENT DOCUMENTS 2046242 11/1980 United Kingdom ................ 225/96
2134101 8/1984 United Kingdom ................ 225/2

Primary Examiner—Hien H. Phan
Attorney, Agent, or Firm—William H. McNeill

[57] ABSTRACT

In a pocket fiber optic cleaver having an elongated substantially cylindrical body arrayed along a longitudinal body axis, the body having, in longitudinal sequence, a fiber entry port, a cut-length adjusting section, a cleaving area, and a waste fiber exit port, and including a cylindrical bore, concentric with the longitudinal axis for receiving an optical fiber, the improvement wherein the cleaving area comprises: a cleaving pad in the form of a cylindrical section whose longitudinal axis is arrayed orthogonal to the body axis; a spring loaded pivot arm adjacent the cleaving pad, the arm carrying a fiber scoring member and having its pivot point adjacent the exit port, the fiber scoring member being adjacent the cut-length area; and a pressure pad surrounding the scoring member on three sides, the open side facing the cut-length section.

4 Claims, 3 Drawing Sheets

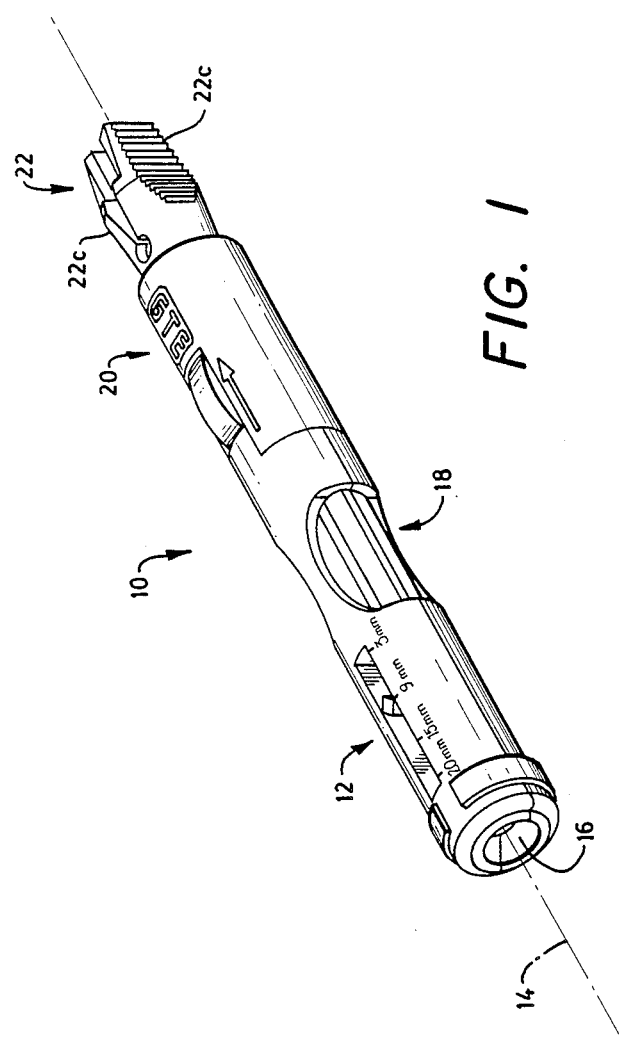

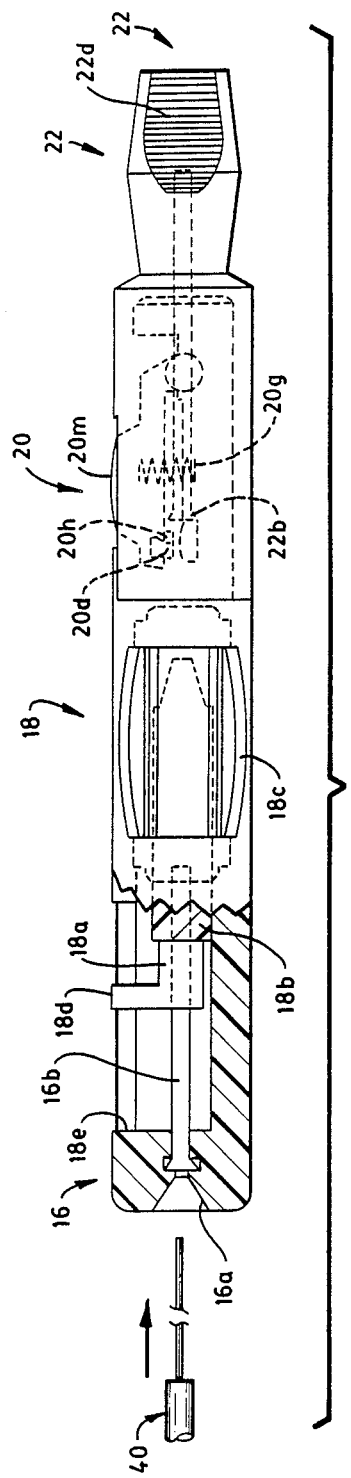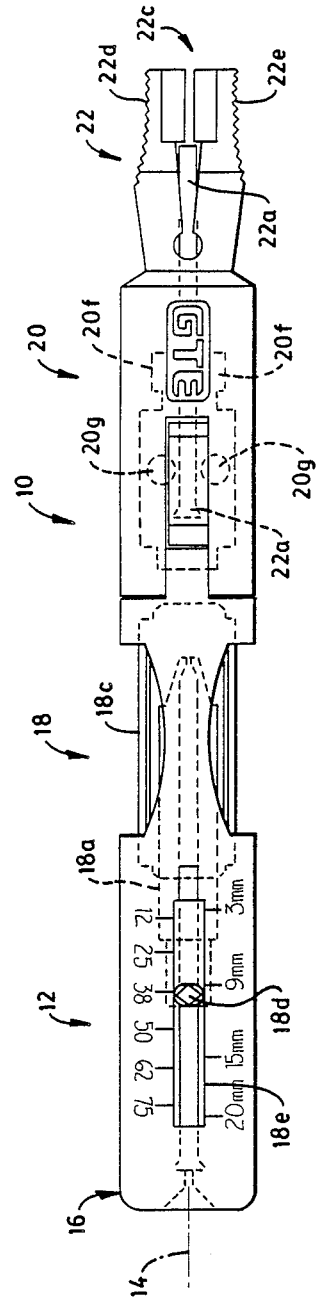

[4,976,390]

POCKET FIBER OPTIC CLEAVER

CROSS-REFERENCES TO RELATED APPLICATIONS

This application contains subject matter similar to, and is an improvement on, Ser. No. 144,706, filed Jan. 14, 1988, which is a continuation of Ser. No. 916,665, filed Oct. 8, 1986, now abandoned.

TECHNICAL FIELD

This invention relates to optical fiber cleavers and more particularly to a small, portable, hand-held tool for providing proper endface preparation.

BACKGROUND ART

Existing hand held tools vary in size, shape, and design. The tools shown in U.S. Pat. Nos. 4,074,840 and 4,159,793 utilize a score and break technique. This involves stretching a fiber over a curved surface having a relatively large radius and holding in place until the fiber is scored by a hard sharp object to produce a microcrack which diametrically propagates through the fiber to produce a clean break. The large, curved surface insures a proper break for the fibers when submitted to increased tension.

The above-described tools are very expensive. They are bulky and require special packaging for shipment and storage. Alignment of the cutting elements is critical and, in the event of improper handling, generally requires return to the manufacturer for repair. Other optical fiber cutting tools are shown in U.S. Patent Nos. 4,262,417; 4,315,368; 4,644,647; 4,552,290; and U.K. Patent Application No. 2046242 A. While these devices all function to some extent, they are limited by complexity, cost, and/or difficulty of use.

DISCLOSURE OF THE INVENTION

It is, therefore, an object of the invention to obviate the disadvantages of the prior art.

It is another object of the invention to enhance the art of optical fiber cutting.

Yet anther object of the invention is the provision of an accurate, inexpensive cleaver for optical fibers.

Still another object of the invention is the provision of an optical fiber cleaving device which is very rugged and which is field repairable.

These and other objects are accomplished, in one aspect of the invention, by the provision of a pocket fiber optic cleaver which has an elongated substantially cylindrical body arrayed along a longitudinal body axis. The body has, in longitudinal sequence, a fiber entry port, a cut-length adjusting section, a cleaving area, and a waste fiber exit port, and includes a cylindrical bore concentric with the longitudinal axis for receiving an optical fiber. The improvement comprises a cleaving pad in the form of a cylindrical section whose longitudinal axis is arrayed orthogonal to the body axis; a spring loaded pivot arm adjacent the cleaving pad, with the arm carrying a fiber scoring member and having its pivot point adjacent the exit port. The fiber scoring member is adjacent the cut-length area. A pressure pad surrounds the scoring member on three sides, with the open side facing the cut-length section.

An additional improvement comprises fiber gripping means which are adjacent the fiber exit port and comprise a pair of opposed finger grips.

This simple but accurate device is economical to manufacture and is extremely rugged. The cleaving member is carried on a replaceable pivot arm and is field serviceable.

BRIEF DESCRIPTION OF THE DRAWINGS

FIG. 1 is a perspective view of an embodiment of the invention;

FIG. 2 is an elevational view partially in section;

FIG. 3 is a plan view; and

BEST MODE FOR CARRYING OUT THE INVENTION

Figure 4:
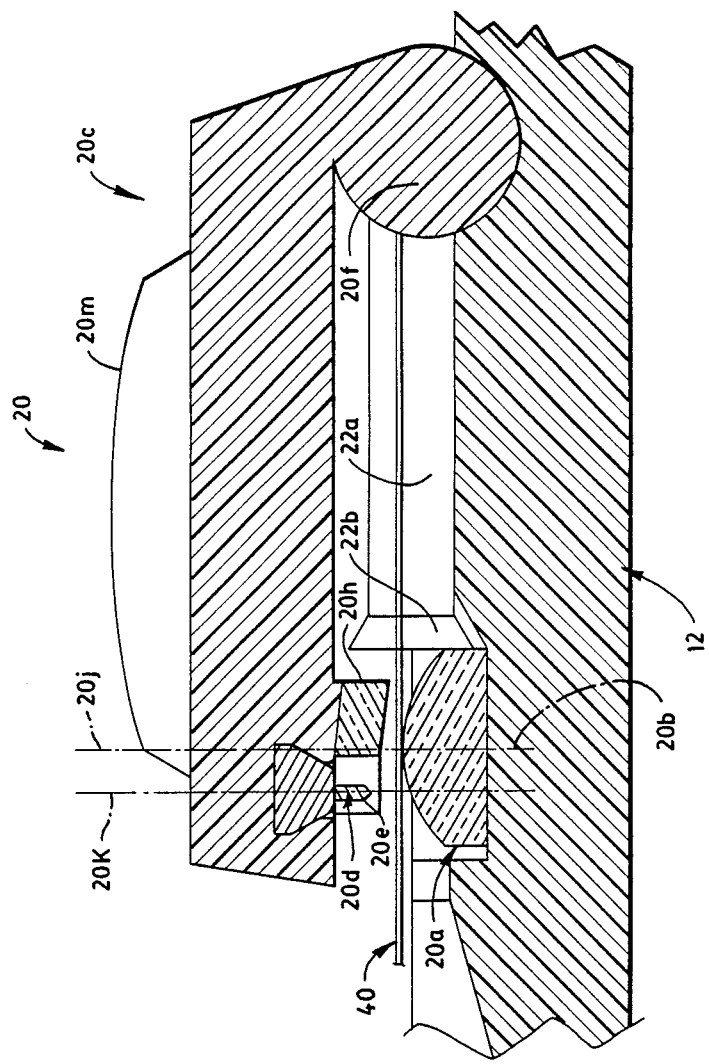
FIG. 4 is an enlarged, sectional view of the cleaving area.

For a better understanding of the present invention, together with other and further objects, advantages, and capabilities thereof, reference is made to the following disclosure and appended claims taken in conjunction with the above-described drawings.

Referring now to the drawings with greater particularity, there is shown in FIG. 1 a pocket fiber optic cleaver 10 having an elongated, substantially cylindrical body 12 arrayed along a longitudinal body axis 14. Body 12 comprises, in longitudinal sequence, a fiber entry port 16; a cut-length adjusting section 18; a cleaving area 20 and a waste fiber exit port 22.

The fiber entry port 16 includes funnel lead-in 16a which leads to a metal tube 16b extending along a cylindrical bore which is concentric with longitudinal body axis 14. The metal tube 16b penetrates the interior of hollow fiber stop 18a which is a part of the cut-length adjusting section 18. The exterior surface of fiber stop 18a is provided with threads 18b which engage interior threads on the inside bore of rotatable adjusting sleeve 18c. A projection 18d extends from fiber stop 18a into slot 18e of body 12. Therefore, rotational movement of adjustment sleeve 18c cause transverse movement of fiber stop 18b and thereby adjusts the length of fiber to be cut.

The fiber to be cut; i.e., Cleaved, extends from the cut-length adjusting section 18 and extends through the cleave area 20, which is shown in enlarged detail in FIG. 4. The cleave area 20 comprises a cleaving pad 20a in the form of a cylindrical section having a longitudinal axis 20b. The axis 20b is arrayed orthogonal to body axis 14. In a preferred embodiment, the curved surface of cleaver pad 20a has a radius of about 0.130 inches. Positioned adjacent to the cleave pad 20a is a spring loaded pivot arm 20c which carries a fiber scoring member 20d which preferably is in the form of a razor sharp diamond 20e. The diamond 20e can be carried in a silicon nitride insert which is dove-tailed into pivot arm 20c. Pivot points 20f are snapped into appropriate receptacles in body 12 and are positioned at the end of arm 20c opposite diamond 20e. Springs 20g hold arm 20c in and "up" position. A pressure pad 20h surrounds diamond 20e on three sides, with the open side facing the cut-length section 18. This pad 20h has a durometer hardness of about 40 on a Shore A Scale, while the Cleaver pad 20a has a hardness of about 55 on the same scale. In a preferred form of the invention, pad 20h is silicone and pad 20a is polyurethane. Both pads can be held in position with a suitable adhesive. Cleaver pad 20a has a second axis 20j which is normal to both the longitudinal body axis 14 and the cleaver longitudinal axis 20b. Scoring member 20d also has a normal axis 20k which is offset from the cleaver normal axis 20j in a direction toward the cut-length section 18. Thus, as can be seen in FIG. 4, when finger pressure is applied to the upper portion 20m of arm 20c which projects slightly above or outside of body 12, the pressure pad 20h first contacts a fiber 40 which lies across cleaver pad 20a. The pressure pad 20h bends the fiber slightly, along the curvature of cleaver pad 20a, before the scoring member 20d contacts the fiber 40 and causes a microcrack to appear.

The waste fiber exit port 22 includes a metal alignment tbe 22a which has a funnel-shaped end 22b positioned immediately adjacent cleaver pad 20a and which extends to the end of body 12 whereat there is provided finger gripping means 22c comprised of compressible, opposed finger grips 22d and 22e. These grips are provided on their inside surfaces with pads which have been grit blasted to secure a fiber therebetween. A preferred material is styrene butediene having a durometer hardness of about 75 on the Shore A Scale.

To use cleaver 10, an optical fiber 40 is stripped of its protective covering to bare a length of fiber whose measurement exceeds the length of the body 12. The cut-length section is adjusted to the proper depth by rotating adjusting sleeve 18c. A scale provided alongside slot 18e can be used to determine the length of cut by reading it against the projection 18d. The fiber 40 is then inserted into the cylindrical bore of body 12 until it projects beyond the end of the finger grips 22d and 22e.

The cleaver is actuated by an operator rubbing a finger across the uppermost portion 20m of cleaver pivot arm 20c, causing it to depress and have diamond 30e contact the fiber and cause a microcrack to appear. The operator then compresses finger grips 22d and 22e to hold the waste end of the fiber therebetween. With the fiber waste end tightly held, the operator grasps the desired end of the fiber and pulls sharply, thus causing the microcrack to propagate through the fiber and complete the operation.

This simplified cleaver greatly adds to the convenience of cleaver operations in the field. Its portablity and adjustability provide cleaved ends of fibers which are suitable for splicing.

While there have been shown what are at present considered to be the preferred embodiments of the invention, it will be apparent to those skilled in the art that various changes and modifications can be made herein without departing from the scope of the invention as defined by the appended claims.

We claim:

1. In a pocket fiber optic cleaver having an elongated substantially cylindrical body arrayed along a longitudinal body axis, said body having, in longitudinal sequence, a fiber entry port, a cut-length adjusting section, a cleaving area, and a waste fiber exit port, and including a cylindrical bore concentric with said longitudinal axis for receiving and optical fiber, the improvement wherein said cleaving area comprises: a cleaving pad in the form of a cylindrical section whose longitudinal axis is arrayed orthogonal to said body axis; a spring loaded pivot arm adjacent said cleaving pad, said arm carrying a fiber scoring member and having its pivot point adjacent said exit port, said fiber scoring member being adjacent said cut-length adjusting section; and a U-shaped pressure pad having a bight defined by three closed sides and an open side, said three closed sides substantially surrounding said scoring member, said open side facing said cut-length adjusting section.

2. The cleaver of claim 1 wherein said cleaving pad has a second axis normal to said longitudinal body axis and said cleaver longitudinal axis; said scoring member has a normal axis substantially parallel to said cleaving pad second axis; and said scoring member normal axis is offset from said cleaver pad normal axis in a direction toward said cut-length section.

3. The cleaver of claim 2 wherein said cleaving pad has a given hardness and said pressure pad has a hardness less than said cleaving pad.

4. The cleaver of claim 1 wherein said waste fiber gripping means adjacent thereto comprising: a pair of compressible opposed finger grips.

* * * * *